United States Patent
Wolff

(10) Patent No.: US 9,177,154 B2
(45) Date of Patent: Nov. 3, 2015

(54) REMEDIATION OF COMPUTER SECURITY VULNERABILITIES

(76) Inventor: Todd Wolff, Boerne, TX (US)

(*) Notice: Subject to any disclaimer, the term of this patent is extended or adjusted under 35 U.S.C. 154(b) by 90 days.

(21) Appl. No.: 13/879,533

(22) PCT Filed: Oct. 17, 2011

(86) PCT No.: PCT/US2011/056576
§ 371 (c)(1),
(2), (4) Date: Apr. 15, 2013

(87) PCT Pub. No.: WO2012/054401
PCT Pub. Date: Apr. 26, 2012

(65) Prior Publication Data
US 2013/0198848 A1    Aug. 1, 2013

Related U.S. Application Data

(60) Provisional application No. 61/394,217, filed on Oct. 18, 2010.

(51) Int. Cl.
G06F 11/00 (2006.01)
G06F 12/14 (2006.01)
G06F 12/16 (2006.01)
G06F 21/57 (2013.01)
G06F 21/56 (2013.01)
H04L 29/06 (2006.01)

(52) U.S. Cl.
CPC ............ *G06F 21/577* (2013.01); *G06F 21/568* (2013.01); *H04L 63/20* (2013.01); *G06F 2221/034* (2013.01)

(58) Field of Classification Search
CPC . H04L 63/1433; H04L 63/20; H04L 63/1416; G06F 21/577; G06F 2221/033
USPC .......................................................... 726/25
See application file for complete search history.

(56) References Cited

U.S. PATENT DOCUMENTS

| | | | |
|---|---|---|---|
| 2006/0101517 A1* | 5/2006 | Banzhof et al. | 726/25 |
| 2006/0294588 A1 | 12/2006 | Lahann et al. | |
| 2009/0241190 A1* | 9/2009 | Todd et al. | 726/23 |

FOREIGN PATENT DOCUMENTS

| | | |
|---|---|---|
| KR | 10-2006-0133728 | 12/2006 |
| KR | 10-2007-0070287 | 7/2007 |
| KR | 10-2008-0002748 | 1/2008 |
| KR | 10-2009-0010852 | 1/2009 |

* cited by examiner

Primary Examiner — Kambiz Zand
Assistant Examiner — Stephen Sanders

(57) ABSTRACT

A computer security vulnerability remediation system (CSVRS) is disclosed, including a CSVRS client communicatively coupled to a remediation server through a network. The CSVRS client includes software having a security vulnerability, which vulnerability may be known to malicious actors who develop an exploit. In some cases, the exploit is a "zero-day exploit," meaning the vulnerability may not be known to the CSVRS client until the exploit is deployed. A RSP receives information about the exploit and vulnerability from a team of remediation experts. The RSP may prepare a remedial exploit, which carries a self-healing pay load. The remedial exploit may be delivered either through the vulnerability itself, or through credentials granted by the CSVRS client to the RSP. The self-healing pay-load takes appropriate action, such as closing ports or disabling scripts, to prevent the vulnerability from being further exploited.

24 Claims, 7 Drawing Sheets

REMEDIATION OF COMPUTER SECURITY VULNERABILITIES

CROSS REFERENCE TO RELATED APPLICATIONS

This application claims priority to U.S. Provisional Application 61/394,217, entitled "Remediation of Computer Security Exploits," filed on Oct. 18, 2010, which is incorporated herein by reference.

BACKGROUND OF THE INVENTION

This specification relates to the field of computer security, and more particularly to a computer security vulnerability remediation system.

One species of computer attack is the "advanced persistent threat" (APT), in which a malicious actor systematically attacks a computer system or network. An APT attack may begin when the malicious actor discovers a vulnerability and prepares malicious code to exploit the vulnerability (sometimes called an "exploit"). The exploit may include a malicious payload designed to harm the target computer or expose data. In other words, the exploit takes advantage of a vulnerability to grant a malicious actor access to a vulnerable machine. The payload then deploys to create a desired effect.

A prior art method of security remediation includes matching suspect code to a signature of a known exploit. A network protected by prior art methods may, however, still be susceptible to exploits of "zero-day" vulnerabilities.

The term "zero-day" as used in this specification refers to the time elapsed since a vulnerability has been publicly disclosed. Day $D_{-N}$ may refer to the date when a malicious actor identifies a vulnerability. Day $D_0$, or "zero day," refers to the day when the exploit is first released into the wild. $D_0$ is generally the first day on which a vendor becomes aware of the exploit in its code and can begin working on a patch to cure the vulnerability. The vendor then tests the patch and deploys the patch on day $D_N$. The period between $D_{-N}$ and $D_N$ represents the malicious actor's "window of opportunity." The period between $D_0$ and $D_N$ represents the time during which vulnerable machines are at risk of an exploit.

In the worst cases, the gap between $D_{-N}$ and $D_N$ can be years. For example, in 2008 a vulnerability was discovered in Microsoft Internet Explorer that had existed in all versions since at least 2001.

SUMMARY OF THE INVENTION

Figure 1:
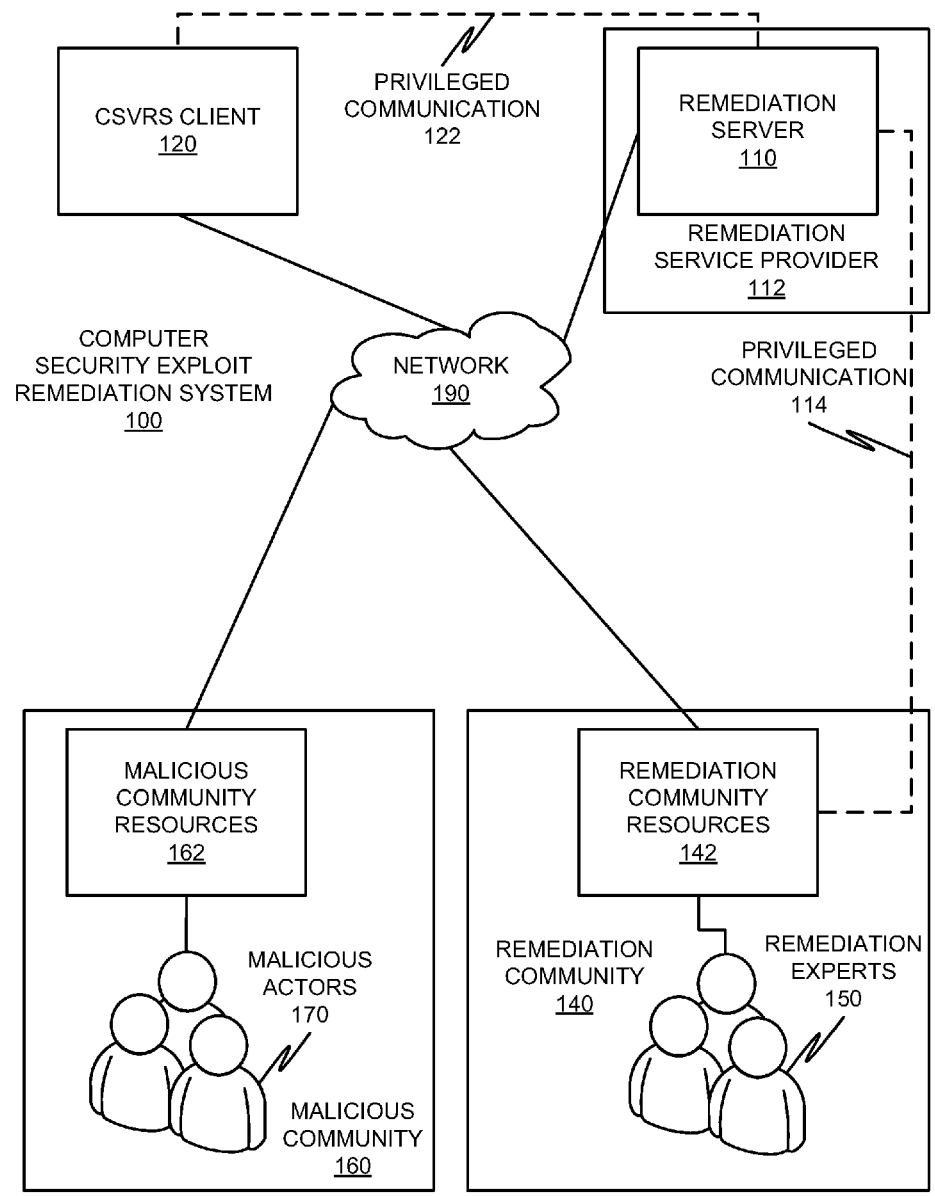
FIG. 1 is a network-level diagram of a CSVRS of the present specification.

In one exemplary embodiment, a computer security vulnerability remediation system (CSVRS) is disclosed, including a CSVRS client communicatively coupled to a remediation server through a network. The CSVRS client includes software having a security vulnerability, which vulnerability may be known to malicious actors who develop an exploit. In some cases, the exploit is a "zero-day exploit," meaning the vulnerability may not be known to the CSVRS client until the exploit is deployed. A Remediation Service Provider (RSP) receives information about the exploit and vulnerability from a team of remediation experts. The RSP may prepare a remedial exploit, which carries a self-healing payload. The remedial exploit may be delivered either through the vulnerability itself, or through credentials granted by the CSVRS client to the RSP. The self-healing payload takes appropriate action, such as closing ports or disabling scripts, to prevent the vulnerability from being further exploited.

DETAILED DESCRIPTION OF THE EMBODIMENTS

The present specification discloses a proactive approach to the remediation of "zero-day" security vulnerabilities in computer software by providing a "remedial exploit" carrying a "self-healing payload." In an exemplary embodiment, remedial exploits are provided by a Remediation Service Provider (RSP), which monitors a client having a client network and at least one client computer that is potentially subject to security vulnerabilities. In some embodiments, the methods disclosed do not require installation of additional hardware or software on client computers or within the client network. Identification and remediation of vulnerabilities may instead be initiated by the RSP by enabling the remedial exploit to take advantage of the same vulnerability that threatens the client. The RSP may have an existing contractual agreement with the client, which permits the RSP to legally deploy the remedial exploit, which delivers a self-healing payload to protect the CSVRS client from the vulnerability.

When a self-healing payload inserts itself into the client computer, it may take steps to remedy the vulnerability, for example by modifying local firewall rules to prevent malicious inbound packets from reaching the client, placing a "sandbox" around a particular application, limiting the scope of actions that a particular script can take, or otherwise protecting the client machine. Remediation steps are temporary and can be reversed, for example once a permanent, vendor supplied patch that addresses the specific vulnerability is applied.

In another embodiment, a remedial exploit may not be necessary. Rather, the client grants the RSP privileged access to client computers, such as granting the remediation server root-level credentials. When a zero-day vulnerability is discovered, the RSP can use the privileged access to install self-healing payloads on the client machine.

According to a method of the present specification, the RSP may proactively identify vulnerabilities by employing or contracting with a team of remediation experts, which may be part of a larger remediation community. Remediation experts may have connections with a malicious actors' community. For example, the malicious community may have resources such as toolkits, electronic bulletin boards, mailing lists, online groups, black markets for buying and selling exploits, or other resources intended to help malicious actors identify and exploit vulnerabilities in the $D_{-N}$ phase of the exploits' life cycles.

Many exploits are made public, or semi-public, before $D_0$. For example, online communities of both ethical hackers and malicious hackers collaborate, and share ideas, tool-sets, solutions and ultimately exploits. Some exploits developed by malicious actors are made available for sale on black market "underground economy servers." Remediation experts can anonymously purchase, vet, and analyze malicious exploits to better understand the threats they pose. By keeping abreast of malicious activities, remediation experts remain cognizant of the dangers that their clients are exposed to, and are able to take steps to prevent damage.

Once the remediation experts have the malicious code, it can be modified or re-written as a remedial exploit, including a self-healing payload. For example, in one exemplary embodiment, the exploit is rewritten to take advantage of the vulnerability and is enabled to install itself on vulnerable client machines. As one example, the client machine may host a web based application that exposes a SQL injection vulnerability. As one who is skilled in the art will recognize, a SQL injection attack involves sending a parameterized HTTP request that contains a malicious SQL query to a targeted web application, which will pass the SQL query to a database server (DB Server) for processing. When the SQL query is processed by the DB Server, the code compromises the host computer, for example by executing a malicious PHP script as a byproduct of processing the SQL query. The malicious script may then "call back" to the attacker and provide the attacker with root-level access to the compromised machine.

To remedy the exemplary SQL injection vulnerability, a remediation expert may purchase the exploit and modify it to prepare a remedial exploit, including a self-healing payload. For example, the modified SQL injection exploit may configure a firewall to close ports vulnerable to the injection vulnerability, limit certain types of database operations, place the database in a sandbox, or limit the privileges of PHP scripts to prevent a malicious payload from granting root-level access to a malicious actor.

A computer security remediation device and method will now be described with more particular reference to the attached drawings. Hereafter, details are set forth by way of example to facilitate discussion of the disclosed subject matter, but it will be apparent to those having skill in the art that other variations and embodiments are possible. Certain structures and devices are disclosed in block diagram form to clarify and simplify the disclosure.

FIG. 1 is a block diagram of a CSVRS 100. A CSVRS client 120 may be subject to a security vulnerability. RSP 112 operates a remediation server 110. Remediation server 110 may communicate with CSVRS client 120 via network 190, which may be an internal or external network, such as an intranet or the internet. Remediation server 110 may also have privileged communication 122 with CSVRS client 120. Privileged communication 122 may include a network connection behind or within a firewall, or may comprise conceptually privileged communications, such as remediation server 110 having privileged credentials on CSVRS client 120.

RSP 112 may employ or contracts with remediation experts 150. Remediation experts 150 may have access to remediation community resources 142. Remediation community resources 142 may comprise for example toolkits, message boards, mailing lists, and useful information. Remediation community 140 may have privileged communication 114 with RSP 112, which may be similar in nature to privileged communication 122.

Remediation community 140 may also interact with a malicious community 160. Malicious community 160 may comprise malicious actors 170 having access to malicious community resources 162. Malicious community resources 162 may also include toolkits, message boards, mailing lists, information, and black markets for buying and selling computer security exploits. Remediation experts 150 may interact with malicious community 162 to gain information, and in some cases to purchase exploits are toolkits so that they cannot be used for malicious purposes. For example, if remediation experts 150 purchase exploit code from malicious community 160, then the exploit code can be converted to deliver a self-healing payload. The modified exploit code can then be delivered to RSP 112, so that remediation server 110 can deliver the self-healing payload to CSVRS client 120. Once the self-healing payload has been delivered to CSVRS client 120, then malicious exploits that take advantage of the same vulnerability will be limited in their effectiveness.

In an exemplary embodiment, remediation server 110 is operated by RSP 112, employing remediation experts 150, who identify potential exploits and vulnerabilities. An exploit may include malicious exploits intended to run on CSVRS client 120, harming or exposing data, denying network services, defacing websites, or otherwise causing harm.

When a remediation expert 150 identifies a vulnerability, a programmer employed by RSP 112 may modify the exploit to create a remedial exploit, including a self-healing payload. The remedial exploit may rely on the same vulnerability that is the intended target of the original malicious exploit. But rather than taking malicious action, the remedial payload takes action that ameliorates CSVRS client's 110 vulnerability.

In the exemplary embodiment, remediation server 110 delivers a remedial exploit with a self-healing payload to CSVRS client 120, or to a plurality of CSVRS clients 120 operated by customers of RSP 112. The remedial exploit may take advantage of a known vulnerability to gain access to root-level services or functions on CSVRS client 120. Using root-level functions, the self-healing payload may take actions on client 120, such as disabling certain types of scripting, modifying firewall rules, disabling services, modifying registry settings, downloading programs, executing programs, downloading software updates, installing patches, removing software, modifying privileges, adjusting file attributes, modifying configuration files, downloading antivirus or malware updates, placing selected applications in a sandbox, and upgrading system level components. If a later malicious payload tries to attack CSVRS client 120, the actions) taken by the self-healing payload will ameliorate or eliminate the malicious exploit's ability to cause harm to CSVRS client 120.

Figure 2:
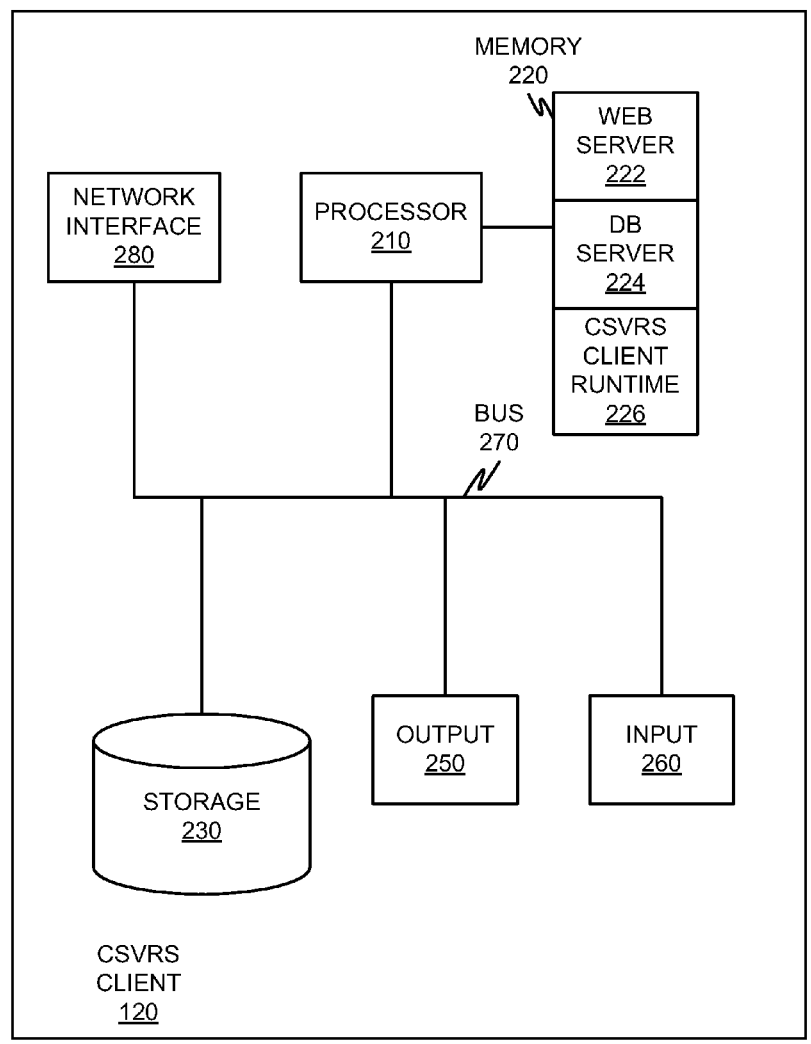
FIG. 2 is a block diagram of a CSVRS client.

FIG. 2 is a block diagram of an exemplary embodiment of CSVRS client 120. CSVRS client 120 is operated by a personal or enterprise client of a RSP. CSVRS client 120 is an example of a computing device, which terms is used broadly in this specification to represent any type of computer or computing device constructed under the so-called "Von Neumann architecture" and having one or more operable network or data ports. References or examples to computing devices, such as remediation server 110 and CSVRS client 120 should be understood to mean any machine under this definition.

CSVRS client 120 is controlled by a processor 210. As used in this specification, processor may refer to a central processing unit, microprocessor, microcontroller, field programmable gate array, application-specific integrated circuit, or other similar programmable logic device capable of executing software instructions. Software instructions for processor 210 may be held in a memory 220, which in some embodiments may be directly connected to processor 210 in a "direct memory access" configuration. As used in this specification, memory may refer to relatively low-latency, volatile main memory, such as random access memory.

In this exemplary embodiment, a distinction is drawn between memory 220, and relatively higher latency storage 230. Storage 230 may be constructed with higher memory density, and may be nonvolatile. For example, storage 230 may be a hard disk drive, flash disk, read-only memory, or other nonvolatile storage medium. Although memory 220 and storage 230 are disclosed as conceptually separate in the present block diagram, in some embodiments, the functions of memory 220 and storage 230 may be combined in a single physical device. For example, some portable computing devices may employ technology such as flash or a battery-operated RAM. In those cases, memory 220 and storage 230 may both be provided by a single physical memory device. Unless otherwise limited, this specification intends to encompass computing devices that have separate memory 220 and storage 230, as well as those that combine the functions of memory 220 and storage 230 into a single physical technology. Software instructions and data may be permanently held in storage 230, and may be loaded into memory 220 for immediate execution.

A bus 270 is provided to communicatively couple processor 210 to other components of the remediation server 110, such as storage 230, input driver 260, output driver 250, and network interface 280. Input 260 is provided for receiving input from an operator of remediation server 110. Output 250 is provided for providing output to the operator of remediation server 110. A network interface 280 is provided to communicatively couple remediation server 110 to a network 190, or provide privileged communication 122,114.

In the exemplary embodiment, CSVRS client 120 is a web server, and has loaded into memory 220 a web server 232 and database server 224. web server 232 and database server 224 may be subject to security vulnerabilities, which may be exploited by malicious actors 170 if not repaired or remedied. For example, when CSVRS client 120 receives a parameterized request, the request is first processed by web Server 222. When the SQL contained within one of the HTTP parameters is processed by web server 222, it is passed to database server 224, which in this example resides on the same physical computing device, but which may reside on a different computing device. When the SQL is processed by DB server 224, the SQL may cause a PHP or other script to execute, which functionality may be exploited by malicious actors 170 if the vulnerability is not remedied.

Optionally, memory 220 may also include a CSVRS client runtime software 226. CSVRS client runtime 226 is provided to enable remediation server 110 to communicate with CSVRS client 120 and remedy vulnerabilities without requiring case-by-case authorization. For example, client runtime 226 may provide remediation server 110 with privileged credentials that allow remediation server 110 to automatically install patches or self-healing payloads to prevent CSVRS client 120 from being harmed by a malicious exploit. If remediation server 110 is delivering a remedial exploit, client runtime 226 may not be necessary. Preferably, CSVRS client 120 should have a contract or other binding agreement with RSP 112 so that actions taken by remediation server 110 remain legal.

Figure 4:
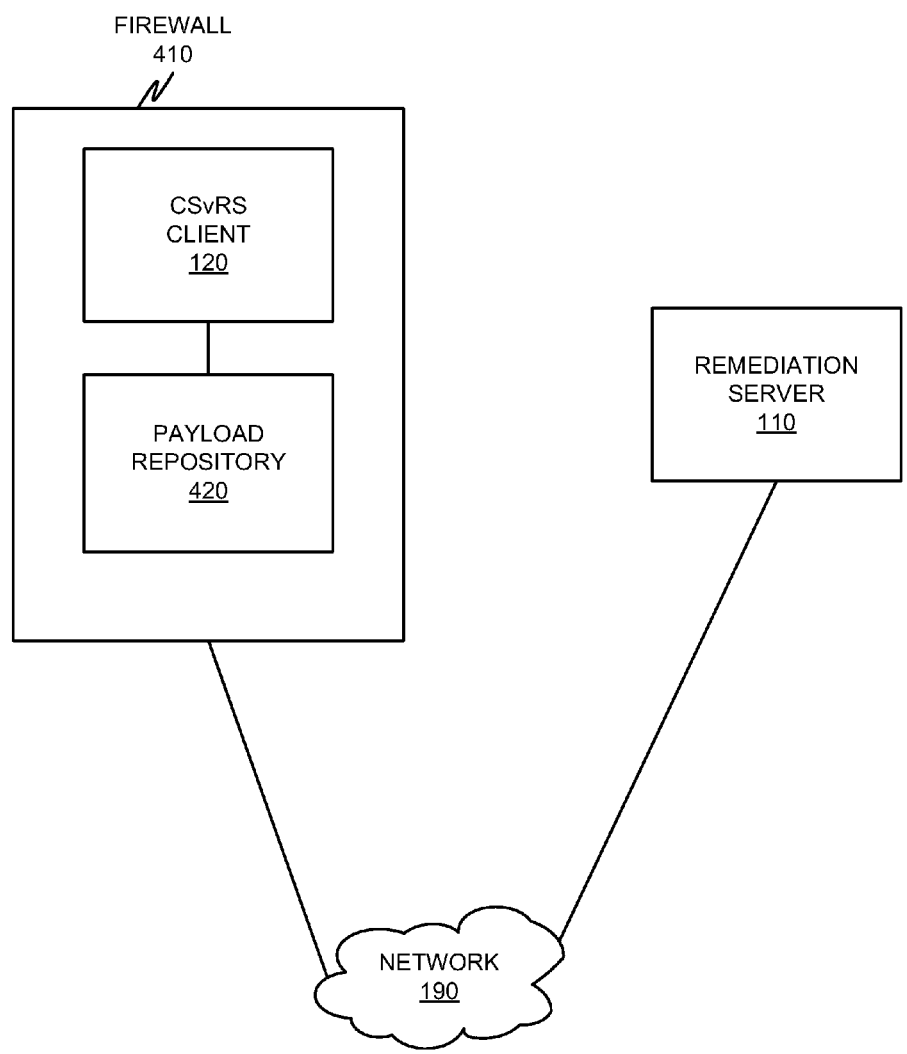
FIG. 4 is a network-level diagram of an alternative embodiment of a CSVRS.

CSVRS client 120 may be, for example, a server operated by a customer of RSP 112. Software running on CSVRS client 120 may expose a vulnerability, such as—by way of non limiting example—a SQL injection vulnerability, a buffer overflow vulnerability, a cross-site scripting vulnerability, a PHP remote file inclusion vulnerability, an integer overflow vulnerability, a cross-site request forgery vulnerability, a malformed input vulnerability, a webroot vulnerability, a form field vulnerability, an eval vulnerability, a directory traversal vulnerability, a format string vulnerability, a symbolic link vulnerability or other operating system related vulnerability and/or application related vulnerability. The vulnerability may allow a payload to take malicious action, for example by executing root-level scripts that capture a user's key strokes, exfiltrate sensitive data, install a bot that participates in an attacker controlled bot net or which uses the compromised machine as point from which additional attacks are launched from within a protected firewall, such as firewall 410 (FIG. 4).

Because the vulnerable software may be provided by a third party, it may be impractical or impossible for the customer to immediately patch the software and prevent exploitation. Thus, CSVRS client 120 may be susceptible to zero-day exploits, and may benefit from CSVRS 100.

Figure 3:
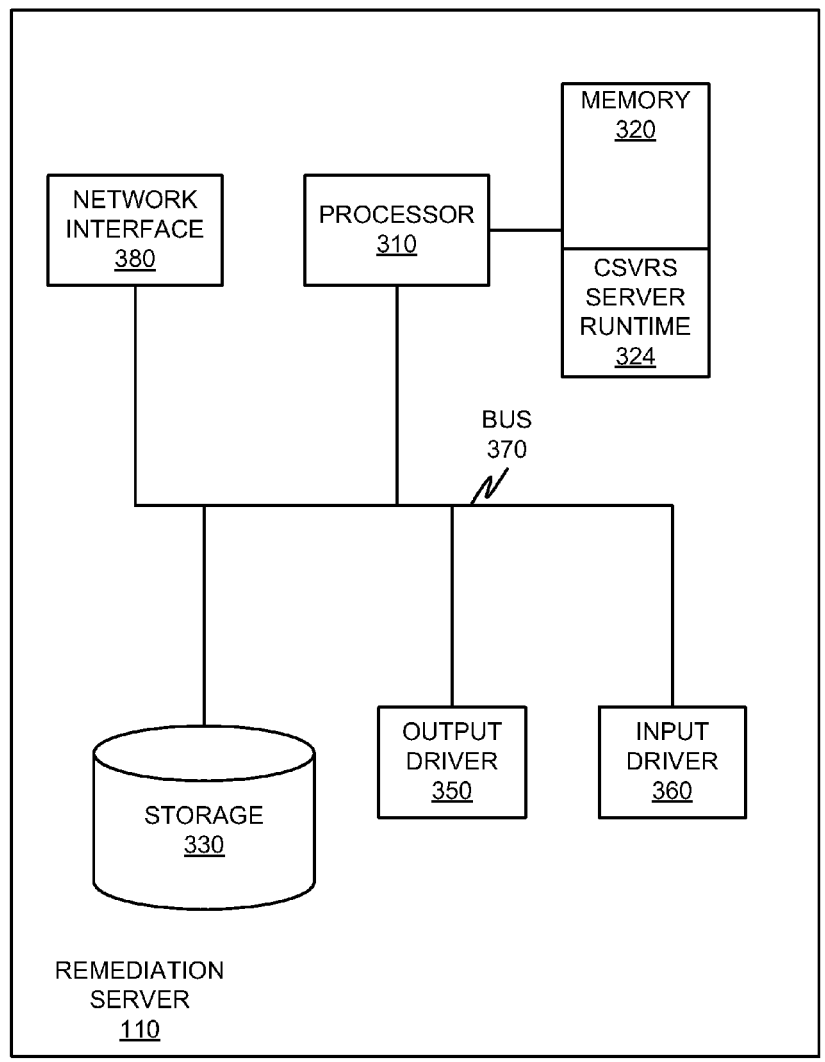
FIG. 3 is a block diagram of a remediation server.

FIG. 3 is a block diagram of an exemplary embodiment of a remediation server 110. Like CSVRS client 120, remediation server 110 is a computing device controlled by a processor 310 communicatively coupled to a memory 320 and storage 330. A bus 370 is provided to communicatively couple processor 310 to other system components. Input driver 360 is provided to receive input from an operator of remediation server 110 and output driver 350 is provided to send output to the operator of remediation server 110. A network interface 380 is provided to communicatively couple remediation server 110 to network 190, or to allow privileged communication 122,114.

Remediation server 110 may have loaded into memory 320 a CSVRS server runtime 324, which provides CSVRS services, for example to CSVRS client 120. CSVRS server runtime 324 is responsible for providing to CSVRS client 120 the software methods disclosed in this specification.

FIG. 4 discloses an alternative embodiment of CSVRS 100. In this embodiment, remediation server 110 is communicatively coupled to a network 190 and CSVRS client 120 is protected by a firewall 410, which is known in the art to be a hardware or software solution for isolating a network from external attacks. Remediation server 110 resides outside firewall 410. A payload repository 420 is provided within firewall 410. Payload repository may contain a plurality of self-healing payloads, which may be updated at regular intervals by remediation server 110 as RSP 112 receives new self-healing payloads from remediation experts 150. In this embodiment, remediation server 110 does not have any direct interaction with CSVRS client 120. Rather, remediation server 110 only provides updates to payload repository 420. Payload repository 420 may then deliver self-healing payloads for unpatched vulnerabilities to CSVRS client 120. Payload repository 420 may be a hardware, software, or combined hardware/software solution.

Figure 5:
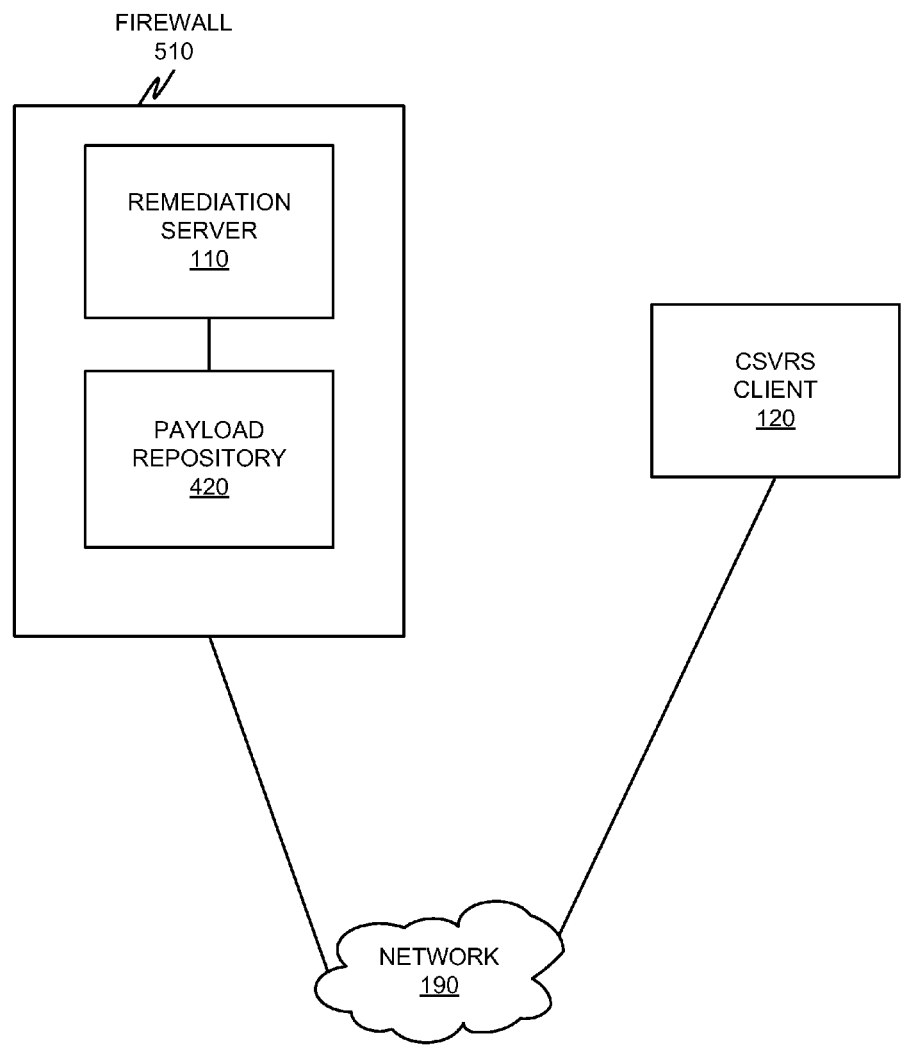
FIG. 5 is a network-level diagram of an alternative embodiment of a CSVRS.

FIG. 5 is another exemplary embodiment of CSVRS 100. In this case, a firewall 510 is provided around remediation server 110. Remediation server 110 hosts a local payload repository 420. Payloads are delivered to CSVRS client 120 over network 190. In this case, remediation server 110 must gain privileged access to CSVRS client 120, for example by having privileged credentials to access CSVRS client 120, or by delivering remedial exploits.

Figure 6:
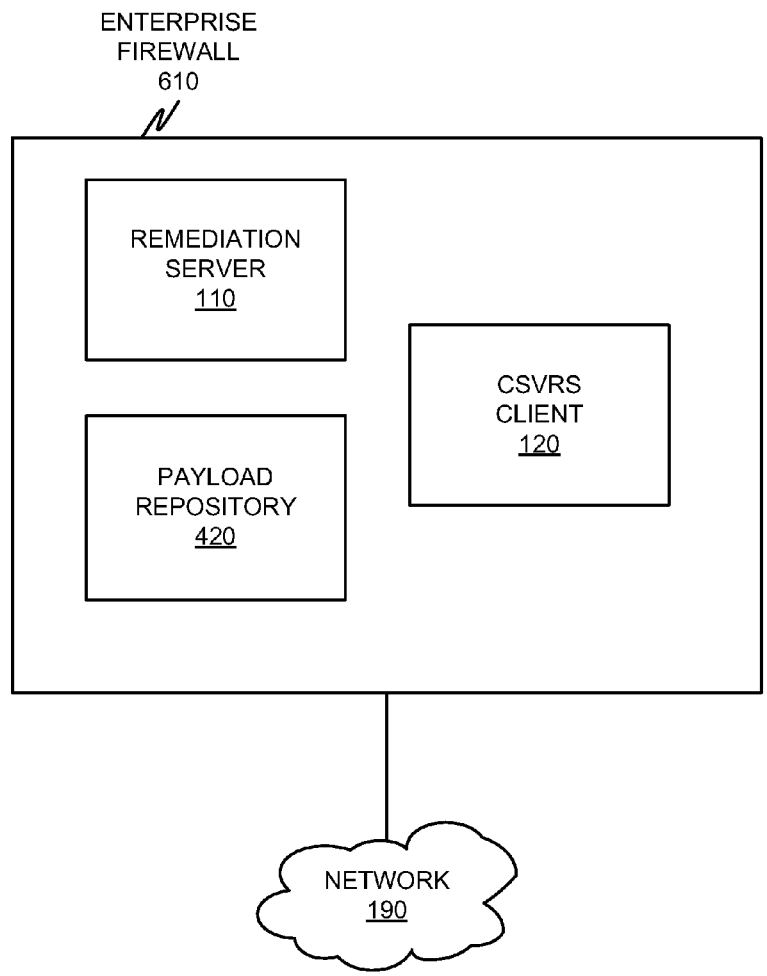
FIG. 6 is a network-level diagram of enterprise CSVRS.

FIG. 6 is an example of a single-enterprise CSVRS solution. In this case, remediation server 110 and CSVRS client 120 both reside within an enterprise firewall 610. Payload repository 420 may also reside within enterprise firewall 610. This permits remediation server 110 to maintain privileged communications with CSVRS client 120 without exposing CSVRS client 120 to additional risk because of the privileged communication 122 granted to remediation server 110. Remediation server 110 may provide may receive periodic updates from remediation community 140.

In this exemplary embodiment, it is not necessary for RSP 112 to be a dedicated enterprise actor. For example, RSP 112 may be an external contractor, which contractor may install remediation server 110 within the enterprise firewall 610. RSP 112 may then provide periodic updates to payload repository 420. In this exemplary embodiment, RSP 112 has no direct access to CSVRS client 120. Instead, RSP 112 interfaces with payload repository 420. RSP 112 may also provide maintenance services on remediation server 110 to ensure that remediation server 110 is maintained up-to-date and fully operational.

Figure 7:
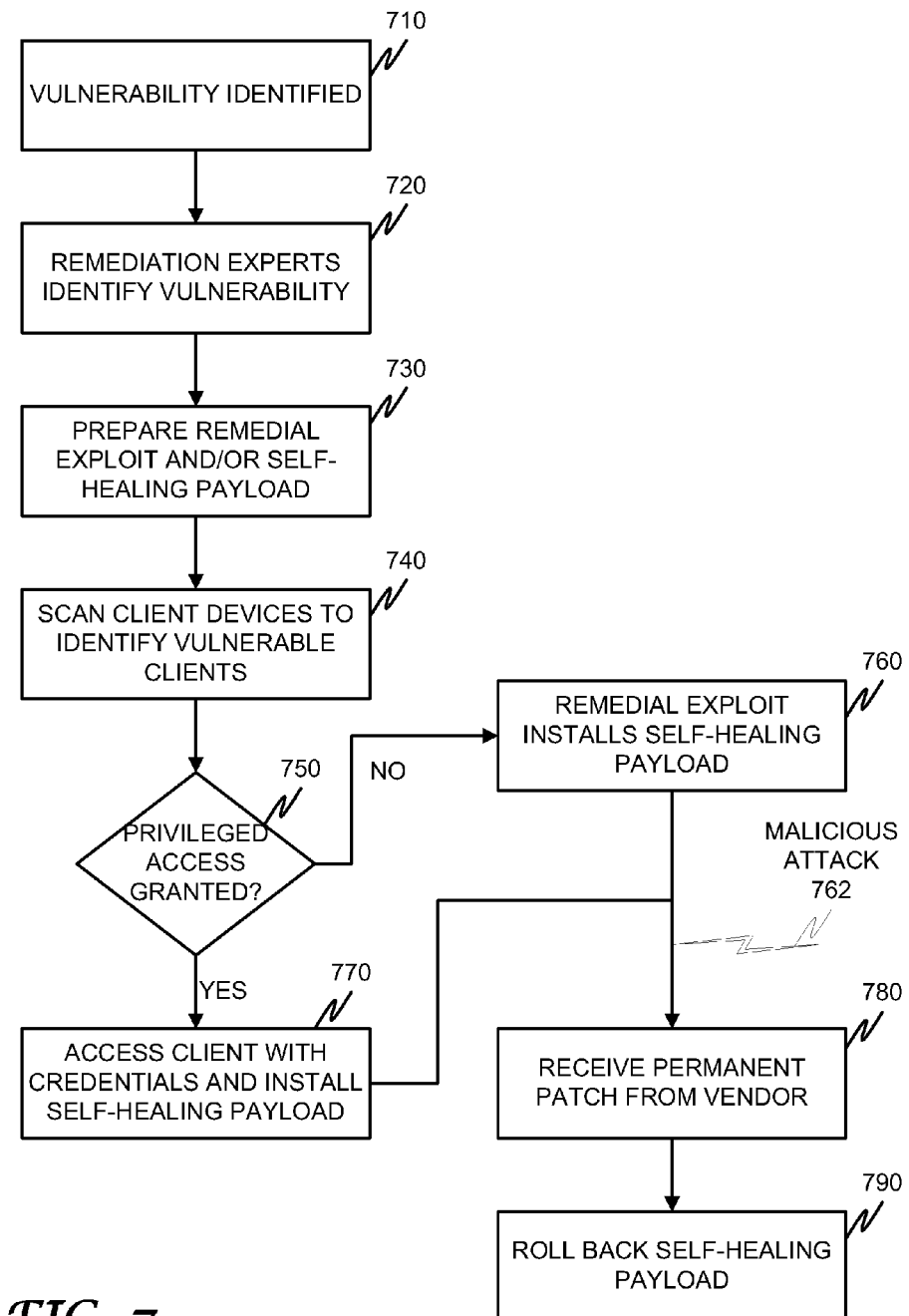
FIG. 7 is a flow chart showing an exemplary method for remediation of a computer security vulnerability.

FIG. 7 is a flowchart of exemplary method of the present specification. In block 710, a vulnerability is identified. The vulnerability may first be identified by remediation experts 150, or by a malicious actor 170. The first identification of the vulnerability is identified as day $D_{-N}$, and represents the opening of the window of opportunity for a malicious actor 170.

In block 720, remediation experts 150 learn of the vulnerability. This may be accomplished by independent research, or through contacts with malicious community 160 or access to malicious community resources 162. The represents the opening of remediation community's 140 window of opportunity to begin preparing a remedial exploit and self-healing payload, as in block 730, designed to close attack vectors created by the vulnerability.

In block 740, client devices such as CSVRS client 120 are scanned to determine whether they are subject to the vulnerability. Scanning can take the form, for example, of scans for open ports upon which vulnerable services are listening. The vulnerable services may be services which are exposed by the CSVRS clients 120 operating system, or they may be services which are exposed by applications which run on the CSVRS client 120. Once vulnerable clients are identified, remediation server 110 must determine, in block 750, whether it has been granted credentials to access and install self-healing payloads. If remediation server 110 has credentials, then it may retrieve the appropriate self-healing payload from payload repository 420 and install the payload in block 770. If no credentials are granted, in block 760 a remedial exploit is delivered, which installs a self-healing payload on CSVRS client 120.

Whether a self-healing payload is installed with credentials or by a remedial exploit, CSVRS client 120 should be notified of the installation, including a detailed description of the effects of the self-healing payload. This will ensure that the customer is fully informed of RSP's 112 activities, and will prevent the customer from being surprised if certain functionality has been disabled. The notification may also include instructions for rolling back the self-healing payload, either wholly or in part. For example, the self-healing payload may include an "uninstall" utility that completely rolls back the remediation, and which the customer can launch at will if he or she decides that exposure to the vulnerability is preferable to the loss of functionality. Alternatively, instructions may be provided for selectively rolling back effects. For example, if certain scripting is disabled and certain ports are closed, a customer may decide that the risk of opening the ports is acceptable as long as the scripting remains disabled. In this case, the notification may contain instructions for manually re-opening closed ports.

Once a self-healing payload has been deployed to CSVRS client 120, a malicious attack 762 may be launched against CSVRS client 120. Assuming that the self-healing payload is adequate, malicious attack 762 will be frustrated, or its effects ameliorated.

Generally, the effects of a self-healing payload will not be desirable as a permanent solution. So in block 780, a permanent patch from the vendor of the vulnerable software is applied once available. Presumably, the patch will remove the vulnerability, rendering the remediation superfluous. Once the remediation is superfluous, it can be rolled back in block 790. The roll back may return CSVRS client to its operating state before the self-healing payload was deployed. Rollback may be accomplished manually when a user runs an "uninstall" utility provided with the self-healing payload, or may be accomplished automatically. For example, the patch may automatically cause the self-healing payload to uninstall.

Those having skill in the art will recognize that a remediation server 110 may be operated by an entity other than a RSP 112, and that a plurality of remediation servers 110 may be used to perform assessments and deliver self-healing payloads. Furthermore, a payload repository 420 may be maintained by an entity separate from RSP 112, which may operate a remediation server 110. In other embodiments, remedial exploits may be propagated within a protected network such as enterprise firewall 610 using root-level credentials or by employing "local exploits."

Some countries have enacted laws that prevent propagation using local exploits, and such propagation would generally be considered unethical absent an express contract, but the use of such propagation is within the scope of this specification.

While the subject of this specification has been described in connection with one or more exemplary embodiments, it is not intended to limit the claims to the particular forms set forth. On the contrary, the appended claims are intended to cover such alternatives, modifications and equivalents as may be included within their spirit and scope

What is claimed is:

1. A non-transitory machine-readable storage medium having stored thereon executable software instructions that are configured, when executed, to instruct a processor to:
   communicate with a client computing device;
   evaluate the client computing device to determine whether the client computing device is subject to a known security vulnerability;
   upon determining that the client computing device is subject to the vulnerability, deliver a remedial exploit to the client computing device, wherein:
   the remedial exploit is configured to gain access to the client computing device through the security vulnerability and deliver thereto a self-healing payload; and
   the self-healing payload is configured to take a remedial action to reduce the client machine's exposure to the security vulnerability.

2. The non-transitory machine-readable storage medium of claim 1 wherein the remedial action is selected from group consisting of disabling selected forms of scripting, modifying firewall rules, disabling services, modifying registry settings, downloading programs, executing programs, downloading software updates, downloading antivirus or malware updates, installing patches, removing software, modifying privileges, adjusting file attributes, modifying configuration files, upgrading system components, and placing selected software applications in a sandbox.

3. The non-transitory machine-readable storage medium of claim 1 wherein the vulnerability is a zero-day vulnerability.

4. A remediation server comprising:
   a processor;
   a network interface configured to communicatively couple the processor to a client computing device;
   a memory having stored therein software instructions executable by the processor, and configured when executed to instruct the processor to:
   receive a list of known unpatched security vulnerabilities;

scan the client computing device to determine whether the client computing device is subject to a known vulnerability;

upon identifying a vulnerability for the client computing device, retrieve from the payload repository a self-healing payload configured to remedy the vulnerability;

gain access to the client computing device through the security vulnerability; and use the access to deploy the self-healing payload on the client computing device.

5. The remediation server of claim 4 wherein the software instructions are further configured when executed to instruct the processor to:

determine whether a security credential is associated with the client computing device; and access the client computing device through the credential to deliver the self-healing payload.

6. The remediation server of claim 4 wherein gaining access to the client computing device through the security vulnerability comprises delivering a remedial exploit to the client computing device, the remedial exploit configured to exploit the vulnerability.

7. The remediation server of claim 4 wherein the self-healing payload takes a remedial action configured to prevent a malicious exploit from gaining privileged access to the client computing device.

8. The remediation server of claim 4 wherein the self-healing payload takes a remedial action configured to limit the damage that a malicious exploit can do to the client computing device if the malicious exploit gains privileged access to the client computing device.

9. The remediation server of claim 4 wherein the self-healing payload takes a remedial action selected from the group consisting of disabling selected forms of scripting, modifying firewall rules, disabling services, modifying registry settings, downloading programs, executing programs, downloading software updates, downloading antivirus or malware updates, installing patches, removing software, modifying privileges, adjusting file attributes, modifying configuration files, upgrading system components, and placing selected software applications in a sandbox.

10. The remediation server of claim 4 wherein the list of known unpatched security vulnerabilities is received from a payload repository.

11. A method of remedying computer security vulnerabilities, the method comprising:

identifying a security vulnerability on a computing device, identification occurring before day DN;

preparing a self-healing payload configured to reduce risk to the computing device from the vulnerability; and deploying the self-healing payload to the computing device by gaining access to the computing device through the security vulnerability and causing the self-healing payload to take remedial action.

12. The method of claim 11 wherein identifying the security vulnerability comprises interacting with a malicious community to identify vulnerabilities discovered by the malicious community.

13. The method of claim 11 wherein gaining access to the computing device comprises preparing and deploying a remedial exploit configured to exploit the security vulnerability.

14. The method of claim 13 wherein preparing the remedial exploit comprises receiving malicious exploits from a malicious software community and using the malicious exploit to prepare the remedial exploit.

15. The method of claim 11 wherein identifying the security vulnerability comprises independently researching security vulnerabilities.

16. The method of claim 11 wherein preparing the self-healing payload further comprises preparing a remedial exploit, the remedial exploit configured to take advantage of the vulnerability to gain privileged access to the computing device without expressly being granted privileged access by the computing device.

17. The method of claim 16 wherein deploying the self-healing payload comprises executing the remedial exploit on the computing device to gain privileged access to the computing device.

18. The method of claim 11 further comprising the step of rolling back the action of the self-healing payload after receiving a permanent patch to correct the vulnerability.

19. The remediation server of claim 11 wherein the self-healing payload takes a remedial action selected from the group consisting of disabling selected forms of scripting, modifying firewall rules, disabling services, modifying registry settings, downloading programs, executing programs, downloading software updates, downloading antivirus or malware updates, installing patches, removing software, modifying privileges, adjusting file attributes, modifying configuration files, upgrading system components, and placing selected software applications in a sandbox.

20. The method of claim 11, further comprising:

determining whether a security credential is associated with the client computing device; and accessing the client computing device through the credential to deliver the self-healing payload.

21. The method of claim 11 wherein the self-healing payload includes a manually-executable uninstall utility configured to roll back the remedial action taken by the self-healing payload.

22. The method of claim 11 wherein the self-healing payload is configured to automatically roll back remedial actions taken by the self-healing payload upon installation of a permanent remedy to the vulnerability.

23. The method of claim 11 wherein the vulnerability is identified before day Do.

24. The tangible storage medium of claim 1, wherein the software instructions are further configured, when executed, to instruct a processor to:

determine whether a security credential is associated with the client computing device; and access the client computing device through the credential to deliver the self-healing payload.

* * * * *